United States Patent [19]
Raymond

[11] 4,020,742
[45] May 3, 1977

[54] ADJUSTABLE STOP DEVICE

[76] Inventor: Ernest R. Raymond, Washington St., Box 66, Limerick, Maine 04048

[22] Filed: Dec. 2, 1975

[21] Appl. No.: 637,041

[52] U.S. Cl. .............................. 90/11 E; 33/185 R; 269/71
[51] Int. Cl.² ......................................... B23B 7/00
[58] Field of Search .......... 90/11 E, 11 R, DIG. 12; 269/71, 72; 33/185 R, 180 R

[56] References Cited
UNITED STATES PATENTS

| | | | |
|---|---|---|---|
| 3,046,006 | 7/1962 | Kulicke, Jr. | 269/71 X |
| 3,252,222 | 5/1966 | Daniels | 33/185 R |
| 3,855,885 | 12/1974 | Lockhart | 90/11 E |

Primary Examiner—Gil Weidenfeld
Attorney, Agent, or Firm—Mason, Fenwick & Lawrence

[57] ABSTRACT

An adjustable stop device for use on vertical milling machines or the like having a table and a workpiece vise attached thereto, said stop device includes a base plate which may be mounted on the table of the milling machine adjacent the vise and a stop member which is supported by the base plate and is movable transversely, longitudinally and vertically with respect to the table to provide a positive adjustable stop for a workpiece clamped between the jaws of the vise thereby eliminating the time-consuming process of improvising a suitable stop for each lot of parts.

9 Claims, 8 Drawing Figures

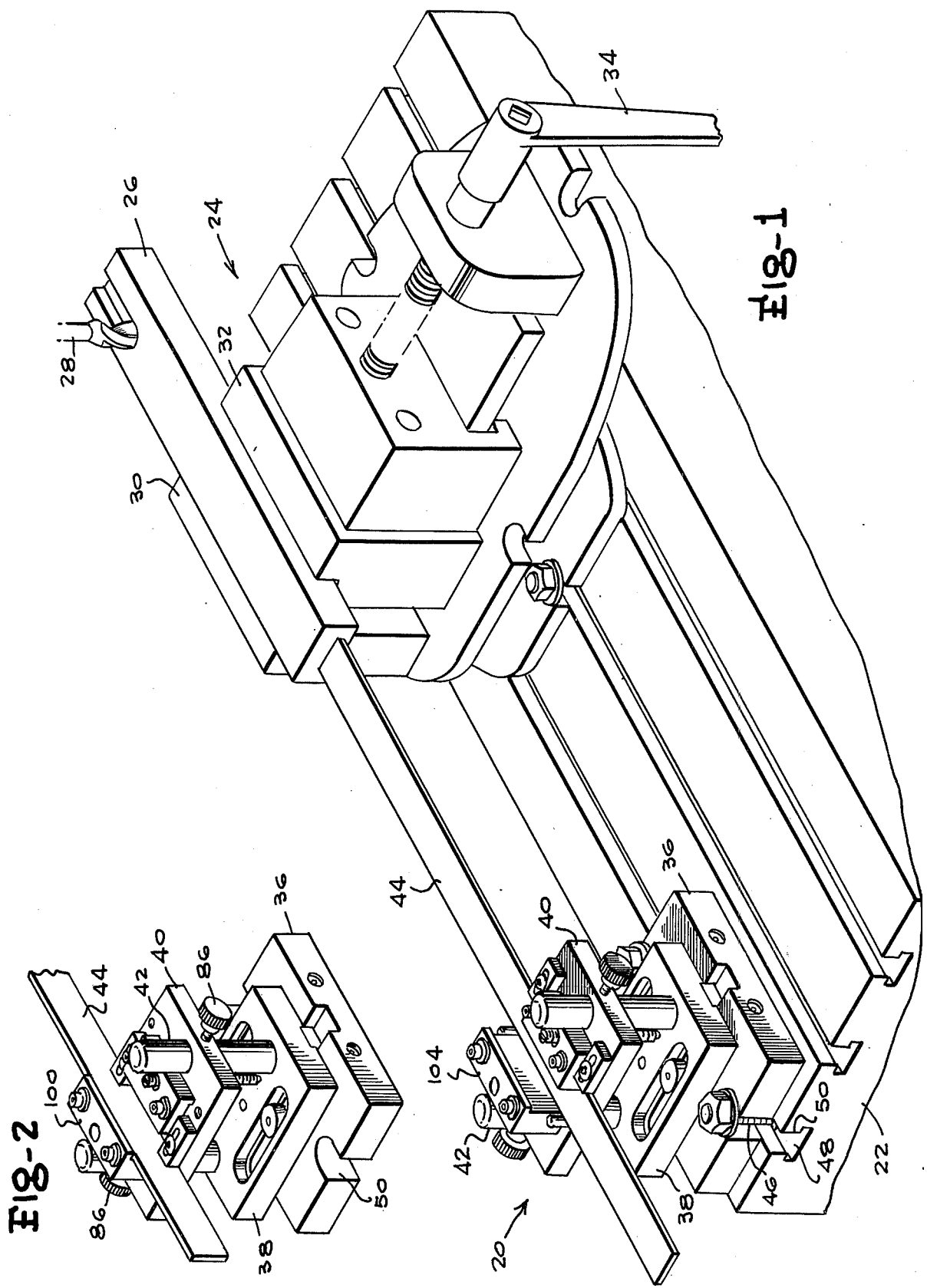

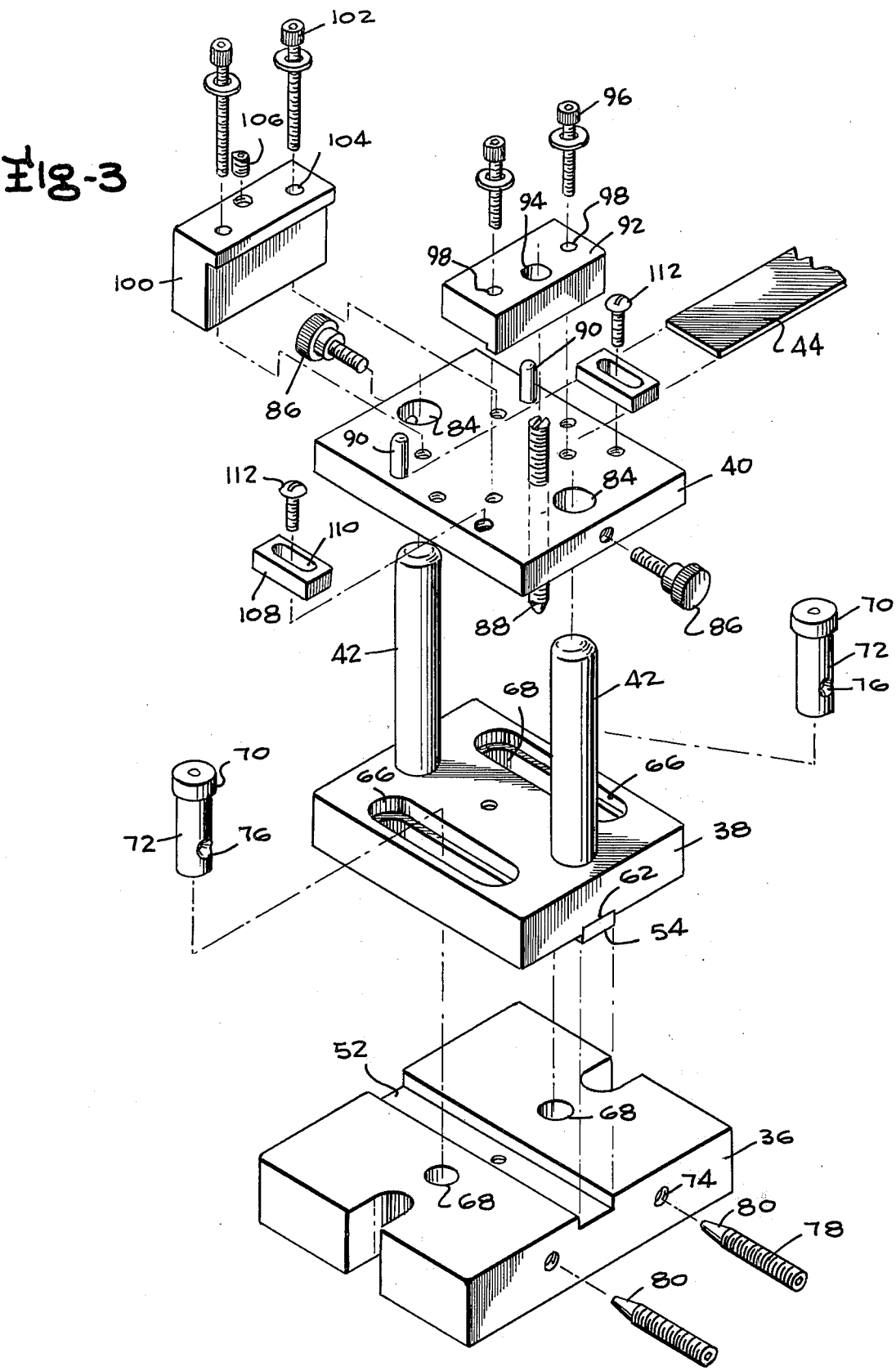

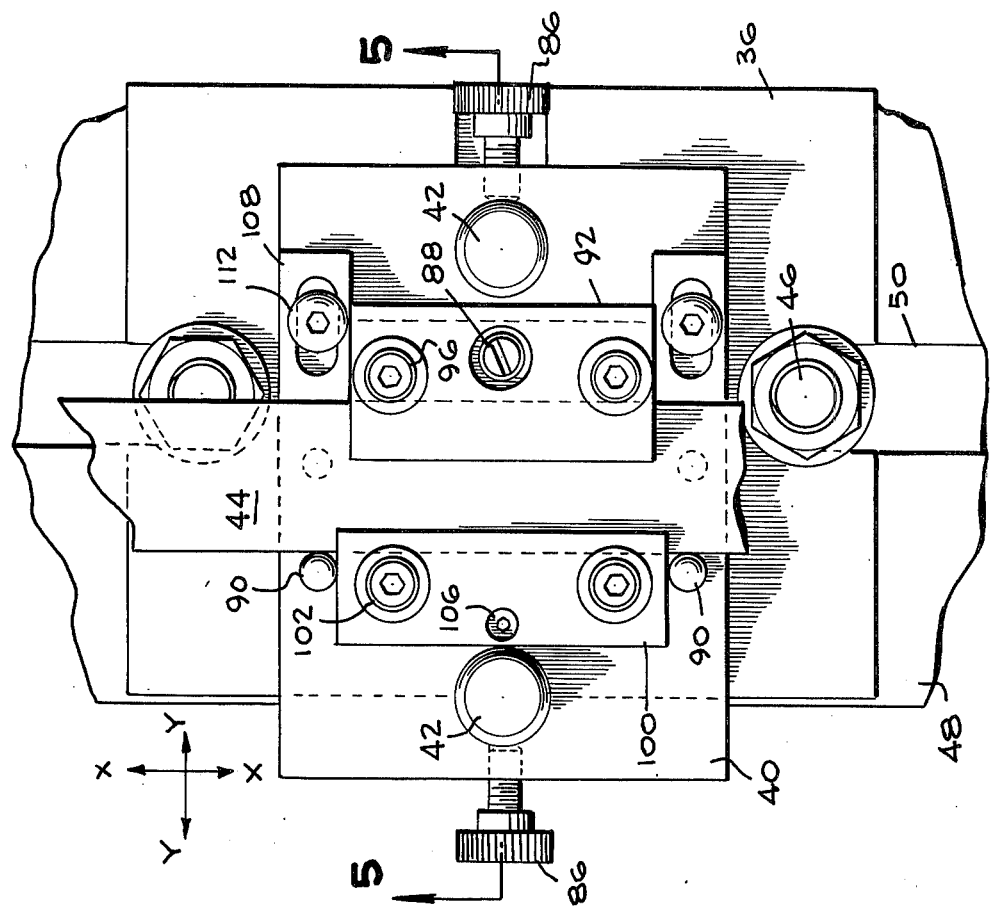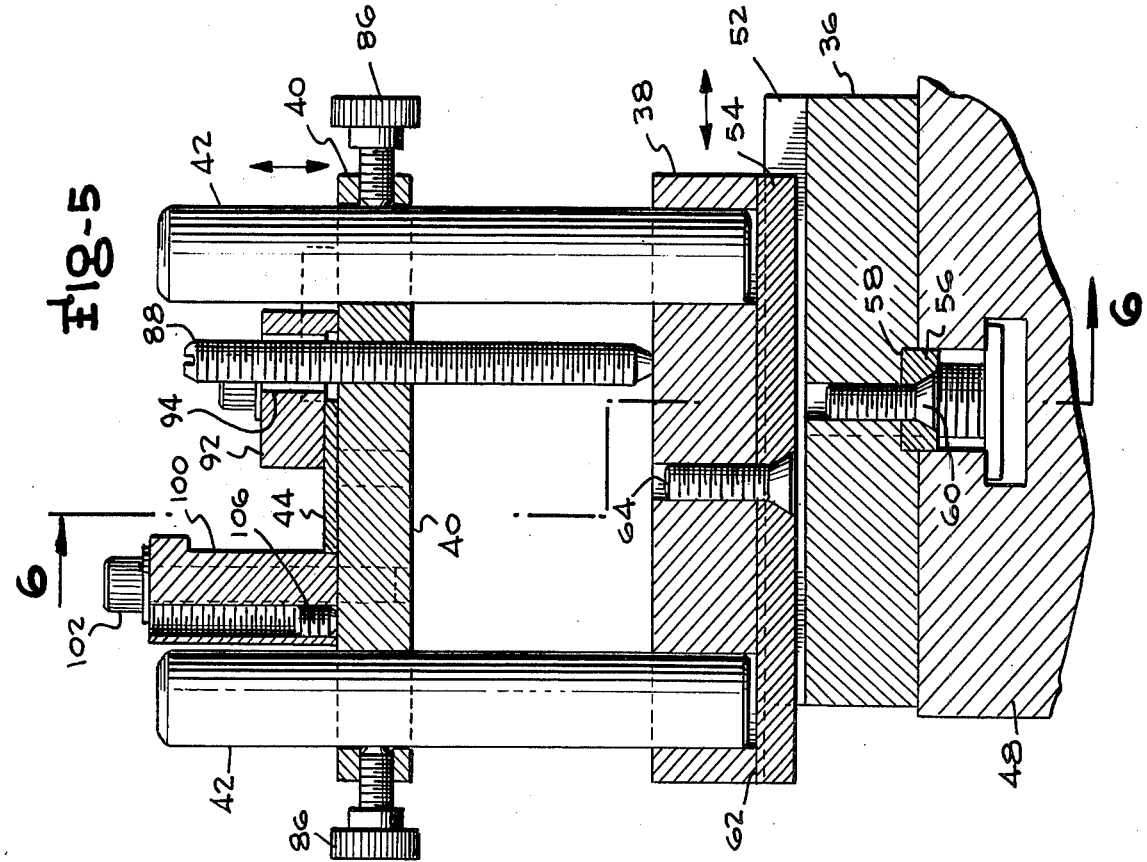

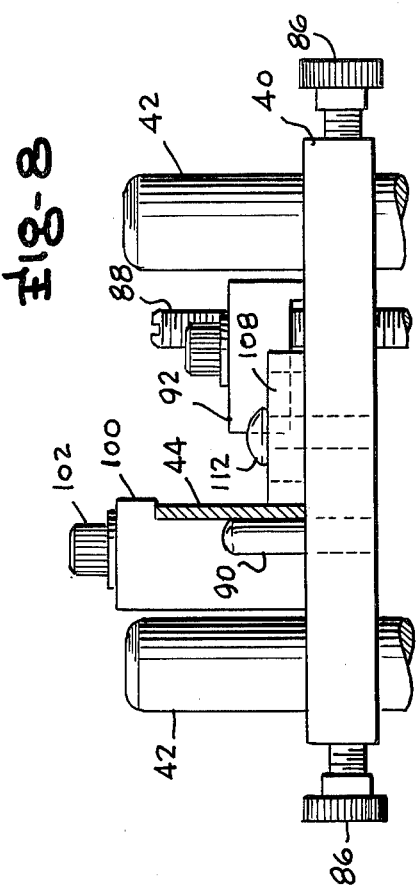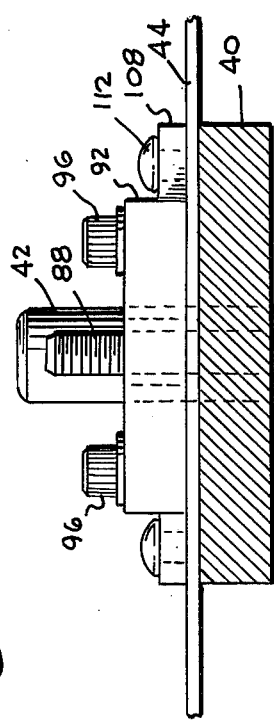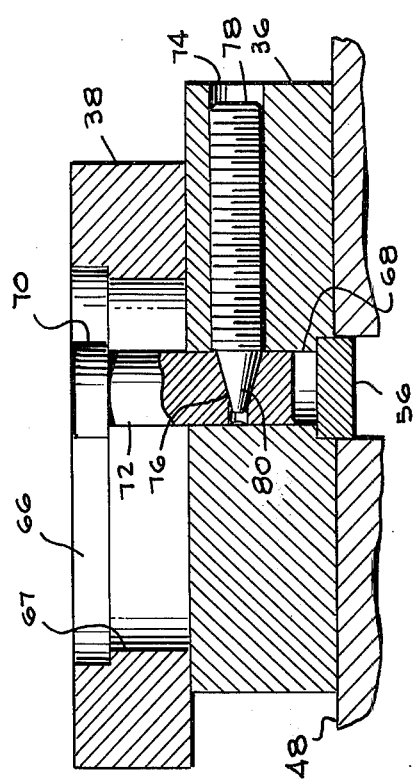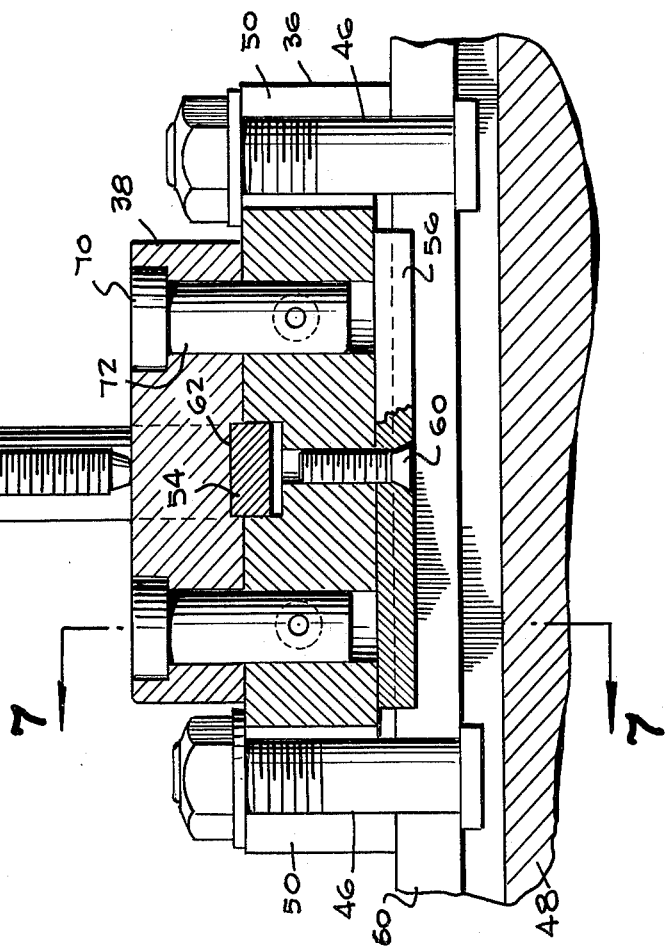

ADJUSTABLE STOP DEVICE

This invention relates to a device for providing a stop for workpieces being clamped between the jaws of a vise such as are used on vertical milling machines and more particularly to an adjustable stop device having a stop member which is moveable transversely, longitudinally and vertically with respect to the table of the machine.

In the prior art, stops for milling machine operations have been improvised to provide a suitable stop for each lot of parts being machined which is a time-consuming process. When the size of the lot has been sufficiently large to justify the additional expense, special stops have been constructed to satisfy the needs of that particular part. Where the size of the lot has not justified the expense, the improvised stops were frequently hazardous which could cause injury to the operator and cause the machining of parts with inaccurate dimensions. These inaccuracies in machining have caused rejection and loss of the parts.

It is, therefore, a primary object of the present invention to provide a new and improved stop device for the machining of parts of varying quantities and dimensions.

Another object of the present invention is to provide a novel stop device which may be fastened at either end of a milling machine table which places it out of the way of the cutters and workpieces.

An additional object of the present invention is to provide an adjustible stop device which eliminates the time-consuming process of improvising a suitable stop for each lot of parts being machined and provides a safer and more efficient method of positioning workpieces.

A further object of the present invention is to provide a novel adjustable stop device which may be quickly and easily adjusted to any desired position.

A still further object of the present invention is to provide an adjustable stop device including a stop blade which may be either the horizontal or veritcal plane to enable the use of the stop in almost any conceivable situation which may arise.

An additional object of the present invention is to provide an adjustable stop device including a blade stop which may be removed and reinstalled in seconds without changing the location of the blade stop.

other objects and advantages of the invention will become more apparent to those persons having ordinary skill in the art to which the invention pertains when the following description is taken in conjunction with the accompanying drawings wherein:

FIG. 1 is a perspective view of a system embodying the present invention showing the adjustable stop device with the stop blade in a horizontal position;

FIG. 2 is a perspective view of the embodiment of the present invention illustrated in FIG. 1 with the stop blade in a vertical position;

FIG. 3 is a fragmentary exploded perspective view of the embodiment of the present invention illustrated in FIG. 1;

FIG. 4 is a fragmentary top view of the embodiment of the invention illustrated in FIG. 1;

FIG. 5 is a cross-sectional view taken along line 5—5 in FIG. 4;

FIG. 6 is a cross-sectional view taken along line 6—6 in FIG. 5;

FIG. 7 is a cross-sectional view taken along line 7—7 in FIG. 6;

FIG. 8 is a fragmentary side elevational view of the embodiment of the invention shown in FIG. 2.

Referring particularly to FIG. 1 there is illustrated an adjustable stop device 20 of the present invention which is fastened to a milling machine table 22 adjacent a workpiece vise 24. The workpiece 26 which is to be machined by a milling machine cutter 28 is clamped between a fixed jaw 30 and a movable jaw 32 of the vise 24 when the hand crank 34 is rotated.

The adjustable stop device 20 generally includes a base plate 36, which is fastened to the machine table 22, a lower plate 38 which is slidable transversely of the machine table 22, an upper plate 40 which is slidable vertically of the machine table 22 on guide dowels 42, and a stop blade 44 which is slidable longitudinally of the machine table 22. The stop blade 44 is positioned as shown in FIG. 1 to provide the desired longitudinal stop for the workpiece 26.

The base 36 is attached to the machine table 22 by base mounting bolts 46 with the heads of the bolts inserted into T-slots 48 of the table 22 and the shanks extending upwardly through outwardly opening slots 50 in the two side edges of base plate 36 as shown in FIGS. 1 and 6. A base key 56 mounted in a base key slot 58 and held in position by a base key mounting screw 60 as shown in FIG. 5 extends into slot 50 to provide positive alignment between the base plate 36 and the machine table 22. A base plate slot 52 extends across the upper surface of the base plate 36 perpendicular to the base key 56 and forms a transverse slide with a plate key 54 mounted on the lower plate 38 to permit the stop blade 44 to move transversely of the machine table.

The plate key 54 is mounted in a plate key slot 62 in the bottom face of the lower plate 38 and is held in position by a plate key screw 64 extending through the plate key 54 and into the lower plate 38 as shown in FIG. 5. The lower plate 38 has two binder guide slots 66 which are parallel and equi-distant from the plate key slot 62. The binder guide slots 66 extend through the lower plate and have an inwardly extending ledge 67 around the inner surface of the slot to provide a bearing surface for a bearing head 70 of a binder 72 as best shown in FIGS. 6 and 7. The binder 72 extend through the binder slots 66 and into close fitting binder holes 68 in the base plate 36 and are locked in position with the binder heads 70 bearing against the ledges 67 in the binder guide slots 66 to fix the lower plate 38 to the base plate 36 after the stop blade 44 has been placed in the desired position.

Extending into the base plate 36 parallel to the base plate slot 52 are two threaded bores 74 which open into the binder holes 68. The portion of the binder 72 which extends into the binder hole 68, as shown in FIG. 7, has a conical opening 76 extending radially into the binder and positioned such that its axis is slightly above the axis of the threaded bores 74 when the head 70 of the binder rests against the ledge 67. Binder screws 78 have conical tips 80 and are threaded into the threaded bores 74 with the conical tips 80 engaging the conical opening 76 in the binders 70 as shown in FIG. 7.

The upper plate guide dowels 42 are formed of close tolerance ground rod stock and are presss fitted into spaced apart dowel bores in the lower plate 38 with the dowel bores aligned over the lower plate slot 62. The guide dowels are perpendicular to the upper surface of the plate to position the dowels in a vertical direction.

The upper guide plate 40 has two spaced apart bearing bores 84 extending therethrough and aligned with the guide dowels 42. The diameter of the bearing bores 84 is slightly larger than the diameter of the guide dowels; therefore, the upper plate will slide freely up and down on the guide dowels to permit the vertical positioning of the stop blade 44. Two thumb screws 86 are threaded into the upper plate 40 and into the bearing bores 84 to lock the upper plate on the guide dowels 42 at any desired position. A height adjusting screw 88 is threaded through the upper plate between the bearing bores 84 and has a screw driver slot at its upper end to permit adjustment of the distance between the upper plate 40 and the lower plate 36. The lower end of the height adjusting screw is of reduced diameter and flat at its lower end to engage the lower plate 36 thereby establishing a fixed distance between the upper plate and the lower plate as shown in FIG. 6.

Two positioning dowels 90 are press fitted into bores in the upper plate 40 with a center line extending between the positioning dowels which is perpendicular to the centerline between the bearing bores 84. The stop blade 44 is held in the horizontal position by a horizontal L-shaped clamp 92 having a clearance bore 94 for the height adjusting screw 88. Two socket head screws 96 pass through screw clearance bores 98 in the horizontal clamp 92 and are threaded into the upper plate 40 to lock the stop blade 44 flat against the upper plate and against the positioning dowels 90. The length of the shorter leg of the clamp is approximately equal to the thickness of the blade and prevents the clamp from being cocked when it is locked in position. The stop blade 44 is locked in the vertical position by a vetical L-shaped clamp 100 similar to the horizontal L-shaped clamp 92. The vertical clamp 100 has two socket head screws 102 which pass through screw clearance bores 104 in the vertical clamp and are threaded into the upper plate 40 to lock the stop blade 44 in a vertical position against the upper plate and the positioning dowels 90. The length of the longer leg of the clamp extends downwardly along the side of the stop blade and a socket head screw 106 which is inserted into a threaded bore extends downwardly through the vertical clamp to provide an adjustable height feature which compensates for variations in the width of the stop blade and prevents the vertical clamp from tilting.

Two rectangular adjustable guides 108 have elongated slots 110 extending therethrough to receive a button head socket screw 112 which is threaded into the upper plate at two positions opposite the positioning dowels 90. The adjustable guides hold the stop blade 44 against the positioning dowels 90 in both the vertical and horizontal positions.

When a stop is desired, the base plate 36 is bolted to the milling machine table at the desired position with the stop blade 44 in the horizontal position as shown in FIG. 1 or in the vertical position as shown in FIG. 2. The lower plate 38 is positioned on top of the base plate 36 with the lower plate slots 66 aligned with the binder bores 68. The binders 72 are inserted into the binder bores 68 and the binders screws are tightened until the conical tips 80 engage the conical openings 76. The upper plate 40 is positioned with the bearing bores 84 over the guide dowels 42 and then lowered to the desired position by turning height adjusting screw 88. The upper plate is locked in place in the desired position by tightening the thumb screws 86. The stop blade 44 is positioned against the workpiece 30 in the vise 24 and is clamped in the desired position by forcing the blade against the positioning dowels 90 with the adjustable guides 108 which are locked in position by tightening the button head socket screws 112. Either the vertical clamp 100 or horizontal clamp 92 is forced against the blade by tightening socket head screws 96 or 102 depending on the desired position of the blade. The blade may be removed for clearance by loosening thumb screws 86 and lifting the upper plae 40 from the guide 42. The procedure is reversed to replace the blade without any adjustment required.

From the foregoing detailed description, it will be evident that there are a number of changes, adaptations and modifications of the present invention which come within the province of those skilled in the art. However, it is intended that all such variations not departing from the spirit of the invention be considered as within the scope thereof and as limited solely by the appended claims.

I claim:

1. An adjustable stop device for use on the table of a vertical milling machine to position a workpiece held in a vise secured to said table, said stop device comprising a base attachable to the table and spaced apart from the vise, an elongate stop member mounted on the base and extending into the space between said base and said vise for positioning the workpiece in the vise in a desired location, means for adjustable movement of the stop member along a first axis perpendicular to the base, means for adjustable movement of the stop member along a second axis perpendicular to the first axis, means for adjustable movement of the stop member along a third axis perpendicualr to the first and second axis and each of said means for adjustable movement of the stop member having means associated therewith for releasably locking said stop member in any desired position of adjustment along either of said first, second or third axis whereby the stop member may be moved to the desired position adjacent the vise and locked in said desired position to permit the removal and replacement of the workpiece held in the vise thereby precisely locating each workpiece with respect to the machine.

2. The adjustable stop device of claim 1 additionally including an upper plate with the stop member attached to the upper plate and wherein the means for adjustable movement along the first axis includes a guideway member mounted perpendicular to the base and a guide on the upper plate which is retained by the guideway member and is movable along the guideway member thereby permitting the stop member to be moved vertically with respect to the machine table when the base is mounted on the table.

3. The device of claim 2 additionally including an adjustable screw member threaded through the upper plate with the lower end of the screw member contacting the lower plate whereby the screw member may be adjusted to the desired height to permit removal of the guide on the upper plate from the guideway and a return to the same position.

4. The device of claim 2 wherein the guideway member includes two guide dowels retained in spaced apart perpendicular positions in the lower plate and the guide includes two bearing bores extending through the upper plate whereby the upper plate if free to slide along the guide dowels when the guide dowels are positioned in the bearing bores.

5. The device of claim 4 wherein the means for locking the upper platae on the guideway member includes a screw which is threaded through the upper plate and engages one of the guide dowels.

6. The adjustable stop device of claim 1 wherein the base includes a base plate and a lower plate and the means for adjustable movement along the second axis includes a slot extending into an upper surface of the base plate and a rectangular key extending downwardly into the slot thereby permitting the lower key plate to translate with respect to the base plate as the key is moved along the slot.

7. The adjustable stop device of claim 6 wherein the means for locking the lower plate to the base plate includes an elongated binder slot extending through the lower plate parallel to the key, a binder member having a head which presses against the lower plate when the binder member is inserted through the binder slot, said binder member extending into the base plate and haviang a conical depression, and a binder screw threaded into the lower plate to engage the concial depression with a conical tip on the end of the binder member thereby permitting the head of the binder member to be forced against the lower plate which clamps the lower plate against the base plate.

8. The adjustable stop device of claim 2 wherein the stop member is a rectangular blade and the means for adjustable movement along the third axis includes a clamp having a first leg contacting the blade and a second leg contacting the upper plate, a bolt means connecting the clamp to the upper plate, positioning dowels extending from the upper plate to position the blade and adjustable guide members attached to the upper plate for pressing the blade against the positioning dowels.

9. The adjustable stop device of claim 1 wherein the base has means for orienting one of the axes parallel to a longitudinal axis of the table and a second axis parallel to the surface of the table.

* * * * *